United States Patent [19]
Powell

[11] 3,930,711
[45] Jan. 6, 1976

[54] SPECIAL EFFECTS LENS
[76] Inventor: Charles W. Powell, 227 E. 50th St., New York, N.Y. 10022
[22] Filed: Oct. 29, 1973
[21] Appl. No.: 410,454

[52] U.S. Cl. ............................................. 350/4
[51] Int. Cl.² .................................... G02B 27/08
[58] Field of Search ............. 350/4, 5, 175 SL, 251, 350/252; 353/1, 2

[56] References Cited
UNITED STATES PATENTS

| | | | |
|---|---|---|---|
| 1,716,668 | 6/1929 | Shore | 350/252 X |
| 1,826,090 | 10/1931 | Phelps | 350/276 SL |
| 2,452,363 | 10/1948 | Flotron | 350/4 |
| 2,454,577 | 11/1948 | Smith | 350/4 |
| 3,111,878 | 11/1963 | Welles et al. | 353/2 X |
| 3,237,512 | 3/1966 | Beverett | 353/2 X |
| 3,383,150 | 5/1968 | Powers | 350/4 X |
| 3,661,439 | 5/1972 | Burnside | 353/1 |

FOREIGN PATENTS OR APPLICATIONS
1,900,881  7/1970  Germany .................................. 350/4

Primary Examiner—Richard M. Sheer
Assistant Examiner—Alan Mathews
Attorney, Agent, or Firm—Amster & Rothstein

[57] ABSTRACT

A special effects lens including a longitudinal housing of substantially triangular shape in transverse section having a spherical lens snap-fitted into one end thereof and held in place by cutouts formed in the sides of the housing. The housing is also provided with transverse slits for the insertion of colored inserts which are mounted at the apices of the housing adjacent the spherical lens to increase the variety of patterns and images produced. In addition, the viewing end of the lens may be provided with a camera adapter ring so that the lens may be mounted on a camera.

3 Claims, 4 Drawing Figures

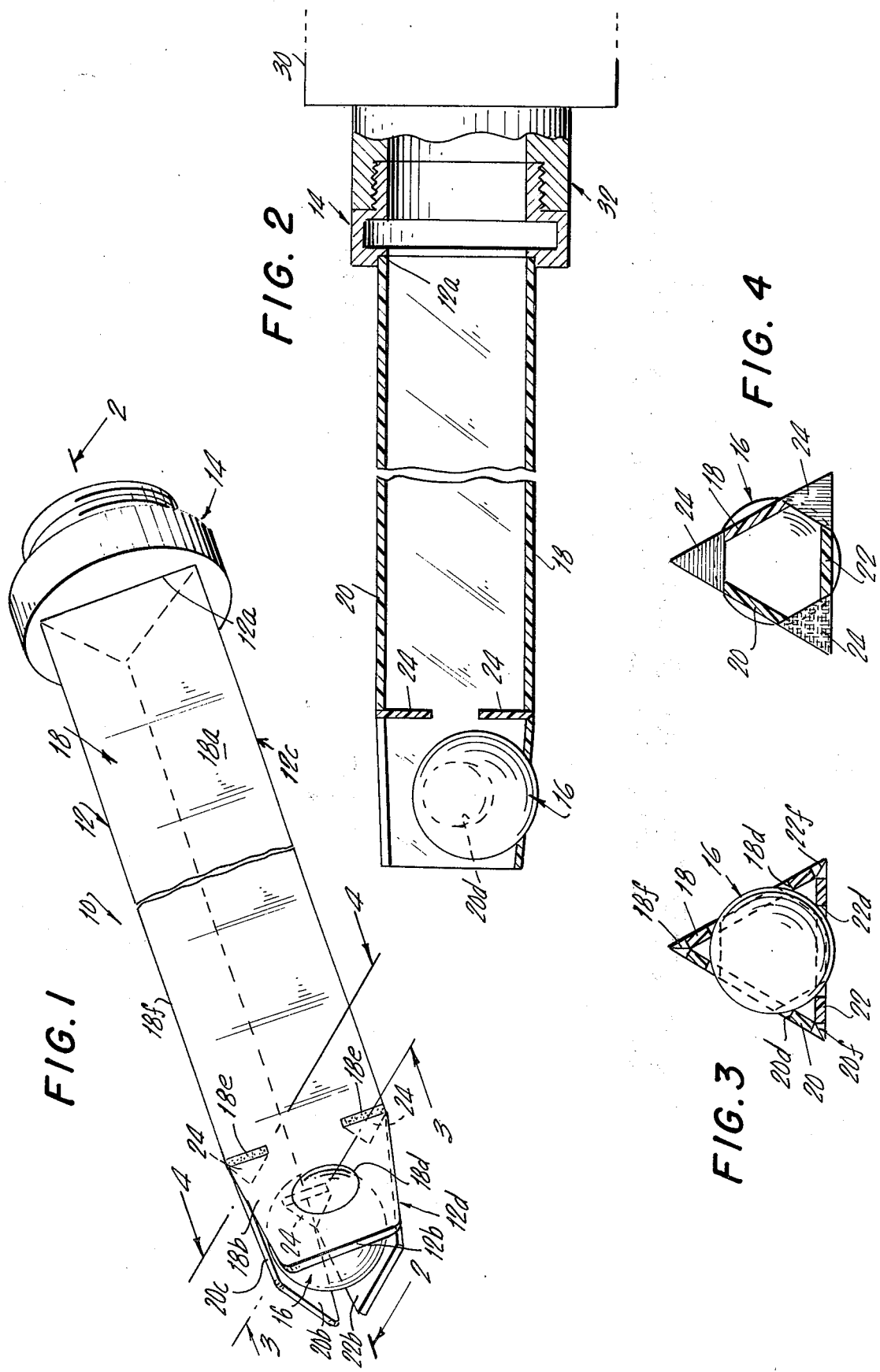

SPECIAL EFFECTS LENS

The present invention relates generally to optical devices and, in particular, to a lens which provides special effects of reflected images.

In the optical field, it has long been desired to produce reflected images of colorful objects which have interesting and varied patterns. Typically, a lens is constructed to provide special effects of objects observed through the lens so that it may produce a colorful pattern of reflected images. However, such special effects lenses have not been completely satisfactory in that they have been costly to manufacture and assemble and do not satisfactorily produce clear and sharp images of objects viewed over a wide range of distances. It has also been desired to construct such a lens which is capable of being used on various types of cameras, such as still cameras, movie cameras or television cameras, in order to obtain pictures of the reflected images produced by the special effects lens.

Accordingly, it is an overall object of the present invention to provide a special effects lens which provides interesting and varied patterns of reflected images of objects viewed over a wide range of distances which are clear and sharp. In its commercial form, The special effects lens is of relatively simple construction, is readily manufactured by massproduction techniques at relatively low cost and includes a number of simple and relatively indestructible components.

It is also an object of the present invention to provide a special effects lens having an optimum focal length such that it will produce clear and sharp images of objects viewed over a wide range of distances.

It is a further object of the present invention to provide a special effects lens which may be mounted on any type of camera, it only being necessary to adjust the camera shutter for different light conditions in order to produce clear and sharp pictures.

In accordance with an illustrative embodiment demonstrating objects and features of the present invention, there is provided a special effects lens which includes a longitudinal housing of substantially triangular shape in transverse section. The longitudinal housing is constructed from three longitudinal members each having a main section defining a main housing and an end section defining an end housing. The main sections are attached along their longitudinal edges with any suitable adhesive or cement to form the main housing. However, the end sections are left unattached along their longitudinal edges so that the end sections are relatively movable with respect to each other. Each of the end sections is also provided with a cutout. In this manner, a spherical lens may be mounted in the end housing by a simple snap-fit assembly wherein an oversized spherical lens is inserted into the end housing and forces or flexes the end sections slightly outwardly until the spherical lens is received within the cutouts formed in the end housing. Transverse slits are formed in each of the main sections of the main housing so that colored elements may be inserted and mounted at the apices of the longitudinal housing. Further, the special effects lens may be mounted on any type of camera, such as a still camera, a movie camera or a television camera, with an adapter ring which is snap-fitted to the viewing end of the longitudinal housing and is provided with external threads so that it may be easily mounted on any camera lens by a simple threading operation.

Advantageously, the focal length of the special effects lens, i.e., the distance from the spherical lens to the viewing end of the special effects lens is of an optimum length so that clear and sharp images are produced of objects viewed over a wide range of distances. Further, when the special effects lens is mounted on a camera, it is not necessary to adjust the focal length of the camera to produce clear and sharp images; it is only necessary to adjust the camera shutter for different light conditions. In addition, with the camera adapter ring mounted on the special effects lens, it may be used on any type of camera, including still cameras, movie cameras or television cameras. Further, the spherical lens in combination with the colored inserts produce reflected images and patterns which are interesting, varied and novel.

The above description as well as further objects, features and advantages of the present invention will be more fully understood by reference to the following detailed description of the presently preferred, but nonetheless illustrative embodiment in accordance with the present invention, when taken in conjunction with the accompanying drawings, wherein:

FIG. 1 is a perspective view of a representative form of the present invention having a camera adapter ring mounted thereon;

FIG. 2 is a sectional view, taken substantially along the line 2—2 in FIG. 1 and looking in the direction of the arrows, showing further details of the special effects lens and the manner in which it is mounted on a camera lens;

FIG. 3 is a sectional view, taken substantially along the line 3—3 in FIG. 1 and looking in the direction of the arrows, illustrating the spherical lens and its mounting within the end housing; and FIG. 4 is a sectional view, taken substantially along the line 4—4 in FIG. 1 and looking in the direction of the arrows, showing further details of the colored inserts mounted at the apices of the special effects lens.

Referring now specifically to the drawings and in particular to FIGS. 1 and 2, there is shown one form of the special effects lens of the present invention, generally designated by the reference numeral 10, which includes a longitudinally extending body or housing 12 having a camera adapter ring 14 snap-fitted at the viewing end 12a thereof so that the special effects lens may be connected to a suitable camera 30, as shown in FIG. 2. Adjacent the other end 12b of housing 12, there is a spherical lens 16 snap-fitted therein, as will be more fully explained. Although in the preferred embodiment the special effects lens 10 is shown used with a camera adapter ring 14 for mounting on a camera, it should be understood that this is only illustrative of one of the uses of the lens 10 and that it may be used without a camera.

Longitudinal housing 12 is of triangular shape in transverse section and includes three identical longitudinal members 18, 20, and 22 with each member having a respective main section 18a, 20a, 22a and a respective end section 18b, 20b, 22b. Each of the end sections 18b, 20b and 22b are tapered along their respective longitudinal edges at 18c, 20c and 22c and are each formed with respective openings or cutouts 18d, 20d and 22d. As may be seen in FIG. 1, each of the main sections 18a, 20a and 22a are provided with respective transverse slits 18e, 20e and 22e, for a purpose to be explained. Longitudinal members 18, 20 and 22 may be formed from any suitable material such as plastic, and may be transparent or opaque. The inner surfaces of longitudinal members 18, 20 and 22 act as light-reflecting surfaces when light strikes these surfaces at shallow angles of inclination.

To assemble longitudinal members 18, 20 and 22 and form longitudinal housing 12, each of the main sections 18a, 20a and 22a are attached along their respective longitudinal edges 18f, 20f and 22f by any suitable adhesive or cement. However, longitudinal edges 18c, 20c and 22c of respective end sections 18b, 20b and 22b are left unattached so that the end sections may be flexible or movable relative to one another, for a purpose to be explained hereinafter. In the assembled form, main sections 18a, 20a and 22a form a main housing 12c whereas end sections 18b, 20b and 22b form an end housing 12d.

Spherical lens 16 is formed from a clear glass or plastic ball and is oversized with respect to the dimensions of the end housing 12d formed by the tapered end sections 18b, 20b, and 22b. Accordingly, as tapered end sections 18b, 20b, and 22b are flexible or movable with respect to each other, spherical lens 16 may be inserted into end housing 12d by a simple snap-fit assembly and held in place by respective cutouts or seats 18d, 20d and 22d. More particularly, spherical lens 16 is inserted into end housing 12d by forcing movable end sections 18b, 20b and 22b outwardly with the spherical lens 16, and moving it within end housing 12d until the spherical lens 16 is received within cutouts 18d, 20d and 22d. In this manner, spherical lens 16 is simply snap-fit into position and is mounted for rotation although it is prevented from axial movement within end housing 12d by its oversized surface portions extending out of the housing through respective cutouts 18d, 20d and 22d. It should be pointed out that the tapering of the end sections 18b, 20b and 22b greatly simplifies the snap-fit assembly of spherical lens 16 as it is much easier to insert within end housing 12d.

The location of spherical lens 16 is critical in relation to the focal length of the special effects lens 10, i.e., the distance from spherical lens 16 to the viewing end 12a of housing 12. It has been found that a focal length of between 9 and 12 inches, preferably of 10 inches, provides optimum results for achieving clear and sharp images of objects viewed over a wide range of distances. In addition, when lens 10 is mounted on a camera 30, in order to obtain clear and sharp images, it is only necessary to adjust the camera shutter for different light conditions and adjustment of the focal length of the camera 30 is unnecessary. In obtaining such clear and sharp images, it has also been found that the size of spherical lens 16 is critical and should be approximately one inch in diameter. With such a diameter, spherical lens 16 is also oversized with respect to the transverse dimensions of end housing 12d so that it may be snap-fitted in place and be securely held therein. Light passing through the spherical lens 16 strikes the inner surfaces of longitudinal members 18, 20 and 22 at shallow angles of inclination causing such light to be reflected off these internal surfaces, resulting in multiple reflected images.

In order to increase the variety and interest of the images and patterns obtained with the special effects lens of the present invention, colored inserts 24 are also mounted at each of the apices within main housing 12c adjacent end housing 12d. More particularly, colored inserts 24 are mounted in main housing 12c by inserting them through respective transverse slits 18e, 20e and 22e formed in members 18, 20 and 22. Colored inserts 24 are of clear plastic and triangular in shape so that they may be easily mounted in place at the apices of main housing 12c and may be any suitable colors, such as red, blue and yellow. In addition, any suitable type of adhesive may be used to securely mount colored inserts 24 within main housing 12c.

As shown most clearly in FIG. 2, when it is desired to mount lens 10 on a camera 30, camera adapter ring 14 may be snap-fit to the end 12a of main housing 12c and may be of any suitable type or size to fit various types of cameras, such as still cameras, movie cameras or television cameras. In the present preferred embodiment, special effects lens 10 of the present invention is shown attached to a representative camera 30 having a camera lens 32. The interior of lens 32 is provided with internal threads so as to receive adapter ring 14 which is provided with external threads for mating therewith. In this manner, the camera adapter ring 14 for special effects lens 10 may be simply threaded into the lens 32 of any suitable camera 30.

In view of the foregoing, it will be appreciated that there has been provided in accordance with the principles of the present invention, a special effects lens 10 which provides clear and sharp images of objects viewed over a wide range of distances and which may be easily connected to any type of camera by use of a camera adapter ring 14 mounted at the viewing end of lens 10. In addition, the focal length between spherical lens 16 and camera lens 32 is such that the special effects lens 10 of the present invention provides clear and sharp images of objects viewed over a wide range of distances with it only being necessary to adjust the camera shutter for different light conditions. Moreover, spherical lens 16 may be easily mounted within flexible end housing 12d by a simple snap-fit assembly which greatly reduces the cost of manufacture. Similarly, colored inserts 24, which greatly increase the variety and types of patterns and images which may be produced, may be easily mounted within the apices of lens 10 by simply inserting them through transverse slits formed in the housing. Further, by changing the angle of inclination of lens 10 relative to the objects being viewed and/or by rotating spherical lens 16, the variety of patterns, images and colors which may be produced with special effects lens 10 will be greatly enhanced.

A latitude of modification, change and substitution is intended in the foregoing disclosure. Accordingly, it is appropriate that the appended claims be construed broadly and in a manner consistent with the spirit and scope of the invention herein.

What is claimed is:

1. A special effects lens comprising an elongated housing of substantially triangular shape in transverse section including three longitudinally extending walls each having a main section and an end section, said main section being attached along their longitudinal edges and said end sections being detached from each other, a spherical lens, means for mounting said spherical lens in the end sections of said elongated housing in substantially axial alignment therewith, said mounting means including seats formed on said end sections, said end sections being spaced with respect to each other and in relation to the diameter of said spherical lens to grippingly engage and mount said spherical lens in said seats, a colored element mounted at each of the apices of said elongated housing along a transverse plane, and a viewing end opposite said end section, said main sections of said longitudinally-extending walls being of a length substantially equal to the focal length of said spherical lens such that clear and sharp images of objects viewed over a wide range of distances from said spherical lens are produced at said viewing end.

2. A special effects lens in accordance with claim 1 wherein each of said end sections are tapered along their longitudinal edges so as to form openings which diverge toward said end opening along the longitudinal edges of said end sections and said end sections further define an end opening adapted to receive said spherical lens in said end sections, said end sections being formed of a flexible material deflecting laterally and grippingly engaging said spherical lens by the restoring force in said flexible material, whereby said spherical lens may be inserted through said end opening to outwardly flex said end sections and to snap-fit said spherical lens.

3. A special effects lens in accordance with claim 1 further including means for removably connecting said special effects lens to a camera.

* * * * *